2,995,447
FREE FLOWING DRIED DAIRY PRODUCTS
Richard H. Cipolla, Southport, Conn., and Donald W. Davis, Flemington, and Carl R. Vander Linden, Bound Brook, N.J., assignors to Johns-Manville Corporation, New York, N.Y., a corporation of New York
No Drawing. Filed Jan. 8, 1958, Ser. No. 707,679
10 Claims. (Cl. 99—57)

This invention relates to a method of preventing caking of dried dairy products. More particularly, the invention principally comprises the addition of an innocuous agent which inhibits caking and facilitates the flowability of dried whey and related dairy products, and the resultant non-caking dairy compositions.

Dried dairy products such as whey, skim milk, lactose and the like are highly susceptible to caking or the formation of a hard monolithic or lumpy mass. This undesirable and troublesome tendency or charcteristic, and the extent thereof, is generally attributed to or influenced by a combination of factors, such, for example, as the composition and/or pH of the whey or related dairy products, e.g., whether or not the liquid whey has soured or developed acidity, etc.; its method or means of preparation, e.g., whether spray or roll dried; the type of hydrated crystals in the dried mass; its hygroscopic-like characteristics; pressures due to stacking in storage; etc.; and it is therefore difficult if not impossible to eliminate or regulate caking by influencing or restraining the cause or causes thereof. Once caked or hardened, dry dairy products such as whey or the like typically must be subjected to expensive and burdensome grinding or pulverizing procedures prior to use or consumption. Moreover, the seasonal nature of milk production, that is high productivity during the warm spring and summer months, necessitates extensive storage of the seasonal surpluses of whey and other dried dairy products for substantial periods to maintain a relatively level year-round processing or manufacturing and consumption. This indispensable and often extensive storage further emphasizes the caking tendencies or characteristics of dried whey and similar dried dairy products, and the problems and expense thereof.

In accordance with the present invention it has been discovered that dispersing particulate or powdered hydrothermally reacted or prepared hydrated calcium silicate throughout whey or related dairy products effectively prevents caking of the dried products.

It is a principal object of this invention to provide a method of preventing caking of dried dairy products such as whey which is effective and economical but does not deleteriously affect edible products, and to provide non-caking dried dairy products.

Another object of this invention is to provide dried dairy products such as dried whey or the like which effectively resist caking and contain only relatively small amounts of an economical and innocuous parting or conditioning agent or agents.

A still further object of this invention is to provide a method of minimizing or suppressing caking of dried dairy products and an agent which prevents caking as well as effecting other desirable and advantageous properties or characteristics such, for example, as improving the color of dried whey which in turn increases its consumer appeal, bettering the free-flow characteristics of dried dairy products and thereby facilitating bulk shipping, reducing "plug-ups" or plugging of equipment and ducts by sticky or gummy dairy products, etc.

Other objects and advantages of this invention will be apparent from the following description of the preferred embodiments of this invention.

The foregoing as well as other advantages may be achieved by blending or dispersing a relatively small amount of particulate or powdered hydrothermally reacted calcium silicate throughout dairy products which exhibit caking tendecnies of characteristics when dried. The hydrated calcium silicates may be added to either liquid or dried dairy compositions, that is, they may be added to milk products prior to evaporation of the liquid or water component or to the dried material. The manner or means of adding calcium silicates or dispersing them throughout the liquid or dried dairy products, moreover, is not understood to be material and any conventional and convenient means may be utilized. Obviously, a substantially uniform mixture or dispersion of hydrated calcium silicates throughout the dried dairy product is especially desirable since a relatively uniform consistency of ingredients is necessary to uniformly inhibit caking throughout the mass. Thus, sufficient mixing so as to result in a substantially homogeneous consistency is desirable to effectively and efficiently practice this invention.

Hydrated calcium silicates formed by hydrothermal reaction of lime and silica (i.e., by chemical reaction in the presence of water at elevated temperatures) and of various formulations or compositions have been found suitable for use in the practice of this invention. For example, hydrated calcium silicate compositions such as the calcium silicate hydrate I material described in United States Letters Patent No. 1,574,363 to Calvert and by Taylor, Journal of the chemical Society 163 (1950), xonotlite, a calcium silicate having the molecular composition $5CaO.5SiO_2.H_2O$, and the hydrated calcium silicate products described and/or claimed in copending United States Patent applications Serial Nos. 580,313 and 580,352, both filed April 24, 1956, are typical of hydrothermally reacted calcium silicates which may be effectively utilized as a means of preventing or minimizing caking of dried dairy products such as whey. The calcium silicate composition of Serial No. 580,352 may be defined as comprising a composition of the formula $2CaO.3SiO_2.1$ to $2.5H_2O$ which is characterized by a unique X-ray diffraction pattern having very strong lines $d=3.12$ A. and $d=4.12$ A. and a medium line at $d=8.34$ A. and consists of the reaction product of an aqueous slurry of lime and a siliceous material in a $CaO/SiO_2$ molar ratio of 0.05–0.8 to 1 $SiO_2$ at a temperature of at least 360° F. These hydrated calcium silicates are preferably sized so that all particles are finer than 100 mesh and a substantial part of the particles are finer than 325 mesh.

Effective amounts of hydrothermally reacted hydrated calcium silicates may comprise as little as approximately 0.5% by weight of the total mass and amounts up to approximately 10% by weight of the total mass, for example, may be utilized if desired. Relatively small proportions such, for example, as 0.5% by weight of the total mass improved caking characteristics of dried dairy products but proportions as high as approximately 2 to 5% by weight of the total mass are frequently necessary to suppress or eliminate caking in some dried dairy compositions under usual storage conditions. The upper limit or proportion is only dictated by the maximum ratio of "inert" or non-nutritional material tolerable, and/or, as a practical matter, the cost of the calcium silicate and its application as opopsed to the cost of regrinding or reprocessing caked dried dairy products. However, the preferred proportions comprise approximately 2 to 5% by weight of the total mass and in substantially every instance it has beeen found that such proportions will effectively suppress or eliminate caking in substantially any dried dairy composition under typical storage conditions.

To test and compare the effect of hydrated calcium silicates upon dried dairy products on a laboratory scale a method was devised to evaluate the caking tendencies of dried whey and mixtures of dried whey and hydrated calcium silicate anti-caking agents. This test method comprises depositing a 50 ml. dried sample in a perforated metal mold and placing the mold in a humidity cabinet under a compression load for four days while maintaining humidity conditions at 62±1 percent relative humidity at 105±5° F., then drying the sample in a forced circulation oven (under compression load) for 24 hours at 100 to 110° F. under a low humidity. Upon removal from the oven, the mold is carefully opened and the resultant unbroken cake or mass is transferred to the 4 mesh screen of a nest of screens comprising a 4 mesh and a 20 mesh standard Tyler 8 inch screen, 4 hard wood balls (1 inch in diameter) are then placed on the 4 mesh screen with the caked whey. The sample is screened with a Tyler Rotap sieve shaker, using the 4 mesh screen and 20 mesh screen with a pan and cover, for 60±1 seconds. The percentage of the sample finer than 20 mesh, corrected for the percentage in the original sample coarser than 20 mesh, is used as an index of the extent of caking. The higher the caking index, the lower the degree of caking.

*Example I*

Three samples, one comprising 20 grams of xonotlite and 1000 grams dried whole whey, the second comprising 20 grams of calcium silicate hydrate I and 1000 grams dried whole whey, and the third, a control, simply comprising the same dried whole whey as utilized in the foregoing mixtures, were prepared by thoroughly mixing each to uniformly disperse the calcium silicates added to the first two samples. Each of said samples was then subjected to the foregoing test. The caking index values for each of the said samples are as follows:

| Material: | Caking index |
|---|---|
| Dried whole whey (control) | 11 |
| Dried whole whey containing approx. 2% xonotlite | 40 |
| Dried whole whey containing approx. 2% calcium silicate hydrate I | 30 |

*Example II*

Several samples comprising 2% by weight of hydrated calcium silicate and dried whey were prepared by blending whey with a calcium silicate hydrate I prepared in the conventional manner, a calcium silicate hydrate I prepared according to the procedure disclosed in Serial No. 580,313, and a hydrated calcium silicate of the type disclosed in Serial No. 580,352. These samples were subjected to comparable accelerated caking and evaluation thereof as described above. The average caking index for each of these hydrated calcium silicates is as follows:

| Material: | Caking index |
|---|---|
| Calcium silicate hydrate I | 30 |
| Calcium silicate hydrate I prepared according to Ser. No. 580,313 | 25 |
| Calcium silicate composition disclosed in Ser. No. 580,352 | 28 |

The effectiveness of calcium silicate as an anti-caking agent for dried dairy products has been further demonstrated by storage tests run under normal warehouse conditions.

*Example III*

Whole dried whey was prepared by spray drying the liquid whey to remove most of the moisture and then completing the drying process in a rotary drier. The product was ground and to this was added varying percentages of a hydrothermally reacted calcium silicate hydrate I type of calcium silicate. The mixture was packed in conventional asphalt-laminated paper bags used to pack dried whey and was stored in a warehouse for four months during hot and humid summer months. The bags were opened after this period of storage and the following relative degree of caking was noted:

| | |
|---|---|
| No conditioning agent | Lumpy—unsatisfactory product. |
| 1.2% calcium silicate conditioner | Very few soft small lumps. |
| 2.3% calcium silicate conditioner | No lumps—free flowing. |

It was also noted that the whey containing no conditioner was sticky to the touch whereas the samples containing calcium silicate were dry powders.

*Example IV*

Whole dried whey was prepared by drying liquid whey on a roller drier. The product from the drier was held in a bin for several hours and was then pulverized. Blends of the pulverized whey plus hydrothermally reacted hydrated calcium silicate I prepared by conventional procedures and by the method disclosed in Serial No. 580,313 were prepared in a ribbon mixer and the resultant products were packaged 50 lb. to a bag in paper bags having an asphalt-laminated moisture barrier. These were stored under normal warehouse conditions for five months. The bags were opened and were rated according to the following arbitrary scale.

4—Excellent, complete freedom from lumps
3—Good, contains a few soft lumps
2—Fair, contains many soft lumps
1—Poor, consists of many hard lumps The following results were obtained:

| Material: | Caking index |
|---|---|
| 2% calcium silicate hydrate I | 3.00 |
| 3% calcium silicate hydrate I | 3.22 |
| 4% calcium silicate hydrate I | 3.78 |
| 3% calcium silicate hydrate I prepared by the method disclosed in Ser. No. 580,313 | 4.00 |
| 0%, whey containing no calcium silicate | 1.85 |

It will be understood that the details given are for the purpose of illustration, not restriction, and that variations within the spirit of the invention are intended to be included in the scope of the appended claims.

What we claim is:

1. A method of preventing caking of whey which comprises dispersing finely divided, hydrothermally reacted calcium silicate in amount of approximately 0.5 to 10% by weight of the total mass throughout the whey.

2. A method of preventing caking of whey which comprises dispersing finely divided, hydrothermally reacted calcium silicate in amount of approximately 1 to 5% by weight of the total mass throughout the whey.

3. A method of preventing caking of whey which comprises dispersing finely divided, hydrothermally reacted calcium silicate consisting essentially of calcium silicate hydrate I in amount of approximately 1 to 5% by weight of the total mass throughout the whey.

4. A method of preventing caking of whey which comprises dispersing finely divided, hydrothermally reacted calcium silicate consisting essentially of xonotlite in amount of approximately 1 to 5% by weight of the total mass throughout the whey.

5. A method of preventing caking of whey which comprises dispersing finely. divided, hydrothermally reacted calcium silicate consisting essentially of the composition $2CaO.3SiO_2.1$ to $2.5H_2O$ which is characterized by a unique X-ray diffraction pattern having very strong lines $d=3.12$ A. and $d=4.12$ A. and a medium line at $d=8.34$ A. in amount of approximately 1 to 5% by weight of the total mass throughout the whey.

6. A method of preventing caking of whey which comprises dispersing finely divided, hydrothermally reacted calcium silicate consisting essentially of calcium silicate hydrate I in amount of approximately 0.5 to 10% by weight of the total mass throughout the whey.

7. A method of preventing caking of whey which comprises dispersing finely divided, hydrothermally reacted calcium silicate consisting essentially of xonotlite in amount of approximately 0.5 to 10% by weight of the total mass throughout the whey.

8. A method of preventing caking of whey which comprises dispersing finely divided, hydrothermally reacted calcium silicate consisting essentially of the composition $2CaO.3SiO_2.1-2.5H_2O$ which is characterized by a unique X-ray diffraction pattern having very strong lines $d=3.12$ A. and $d=4.12$ A. and a medium line at $d=8.34$ A. in amount of approximately 0.5 to 10% by weight of the total mass throughout the whey.

9. A method of preventing caking in dried milk products which comprises mixing therewith about 0.5 to 10%, by weight of the total mix, of particulate hydrated calcium consisting essentially of the hydrothermal reaction products of lime and silica, said particulate hydrated calcium silicate being sized finer than approximately 100 mesh.

10. The method of preventing caking in dried milk products which comprises mixing therewith about 2 to 5%, by weight of the total mix, of particulate hydrated calcium silicate consisting essentially of the hydrothermal reaction products of lime and silica, said particulate hydrated calcium silicate being sized approximately 325 mesh.

References Cited in the file of this patent

UNITED STATES PATENTS

| | | |
|---|---|---|
| 1,966,513 | Moss | July 17, 1934 |
| 2,173,922 | Supplee | Sept. 26, 1939 |
| 2,257,545 | Curtis | Sept. 30, 1941 |
| 2,385,075 | Gunther | Sept. 18, 1945 |
| 2,625,513 | Kirschenbauer | Jan. 13, 1953 |
| 2,650,202 | Hawes | Aug. 25, 1953 |
| 2,768,899 | Waldo | Oct. 30, 1956 |